United States Patent [19]
Bruel

[11] 3,941,503
[45] Mar. 2, 1976

[54] HELICOPTER ROTOR HUB PROVIDED WITH FLEXIBLE ELEMENTS SUCH AS VIRTUAL HINGES

[75] Inventor: Andre Bruel, Cascina Costa, Italy

[73] Assignee: Costruzioni Aeronautiche Giovanni Agusta S.p.A., Cascina Costa, Italy

[22] Filed: May 24, 1974

[21] Appl. No.: 472,458

[30] Foreign Application Priority Data
Mar. 7, 1974  Italy .................................. 49159/74

[52] U.S. Cl. ................................. 416/141; 416/138
[51] Int. Cl.² ........................................ B64C 27/38
[58] Field of Search ........... 416/134, 135, 138, 140, 416/141, 136, 139

[56] References Cited
UNITED STATES PATENTS

| | | | |
|---|---|---|---|
| 2,949,967 | 8/1960 | Jovanovich | 416/141 X |
| 3,026,942 | 3/1962 | Cresap | 416/135 X |
| 3,280,918 | 10/1966 | Drees et al. | 416/135 UX |
| 3,520,637 | 7/1970 | Tobey | 416/135 |
| 3,606,575 | 9/1971 | Lermusiaux | 416/141 X |
| 3,695,779 | 10/1972 | Kastan et al. | 416/141 X |
| 3,762,834 | 10/1973 | Bourquardez et al. | 416/140 X |

FOREIGN PATENTS OR APPLICATIONS

| | | | |
|---|---|---|---|
| 1,051,476 | 12/1966 | United Kingdom | 416/138 |

Primary Examiner—Everette A. Powell, Jr.
Attorney, Agent, or Firm—Toren, McGeady and Stanger

[57] ABSTRACT

A helicopter rotor hub is provided with a center plate and a plurality of arms projecting from the center plate. Each of the projecting arms has a slot for receiving a flexible element that is connected to a spindle and grip that supports the rotor blades. The rotor blades can accomplish the movements of flapping and lag by allowing the center plate to have a low stiffness in the vertical plane when the center plate lies in a horizontal plane, and the flexible element a low stiffness in the horizontal plane when the flexible elements lie in the vertical plane, thereby acting as virtual hinges. This allows for the possibility of locating the vertical hinges at an equal distance from the rotor axis, and the pitch variation hinge a small distance from the other hinges, allowing for a relatively small dimension of the hub.

6 Claims, 3 Drawing Figures

3,941,503

HELICOPTER ROTOR HUB PROVIDED WITH FLEXIBLE ELEMENTS SUCH AS VIRTUAL HINGES

BACKGROUND OF THE INVENTION

It is known to the art that helicopters may be classified into three general types having:
a. Rotor with articulated hub;
b. Rotor with semi-rigid hub.
c. Rotor with rigid hub.

To the first type (a) pertain rotors the blades of which can perform three classes of movement, around hinges viz: "lag", "flapping", and "pitch variation"; or "feathering" in the second type of rotor (b) the blades can perform the second and third types of movement while in rotors of the third type (c) the blades can perform pitch variation only.

SUMMARY OF THE INVENTION

The helicopter rotor hub forming the object of this invention belongs to the first type (a).

The rotor hub essentially consists of and is characterized by a center plate which is flexible in the vertical plane and rigid in the horizontal plane, the plate being provided with slots so as to receive elements which are flexible in the horizontal plane and rigid in the vertical plane respectively, the elements being in turn connected to the blade attachment spindles. The elements thus constitute virtual hinges in substitution of the drag hinges and flapping hinges which are normally used in their place.

This particular construction is a substantial improvement in the art to which the invention pertains, inasmuch as it affords the following advantages:
a. the possibility of locating the virtual lag and flapping hinges practically at an equal distance from the rotor's axis of rotation and the pitch variation hinge at a greater distance from the axis of rotation with respect to the other two but only in a small measure, with a resulting considerable reduction of the hub overall dimensions.
b. the possibility to impart individually and within certain limits the required flexibility to the structural components making up said virtual hinges;
c. the possibility achieving as a result of the above, the optimum configuration for a helicopter rotor of the hinge type, from the standpoint of both structural load on the controls and reduced level of vibration;
d. lastly, the possibility, of doing away with any blade movement limiting devices heretofore adopted such as statio stops and bumpers.

BRIEF DESCRIPTION OF THE DRAWING

The helicopter rotor forming the object of this invention and showing one of its preferred embodiments, is illustrated by way of example in the attached drawings in conjunction with the following description: Specifically.

DETAILED DESCRIPTION OF THE INVENTION

Figure 1:
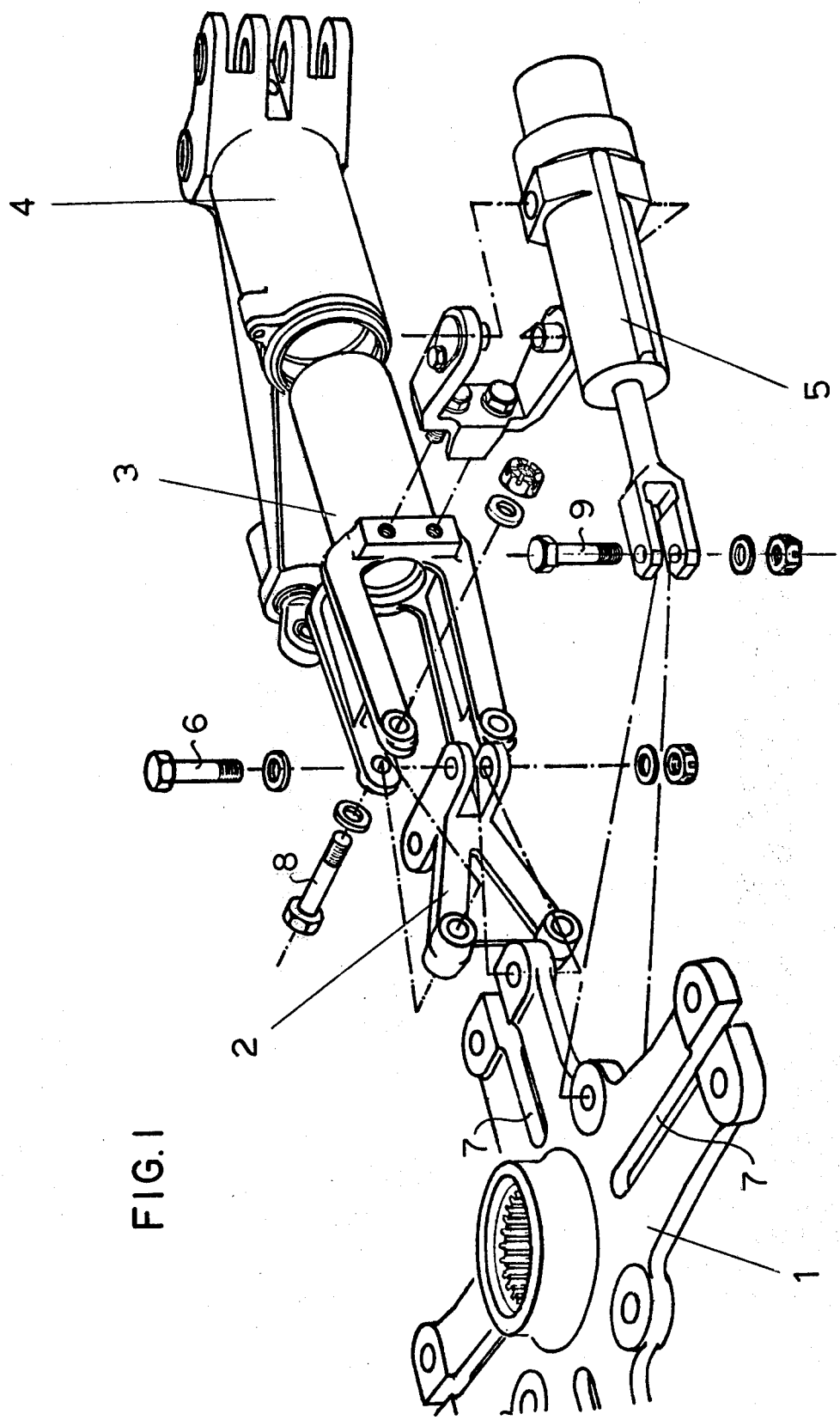
FIG. 1 is an exploded view of the rotor assembly according to the invention.
Figure 2:
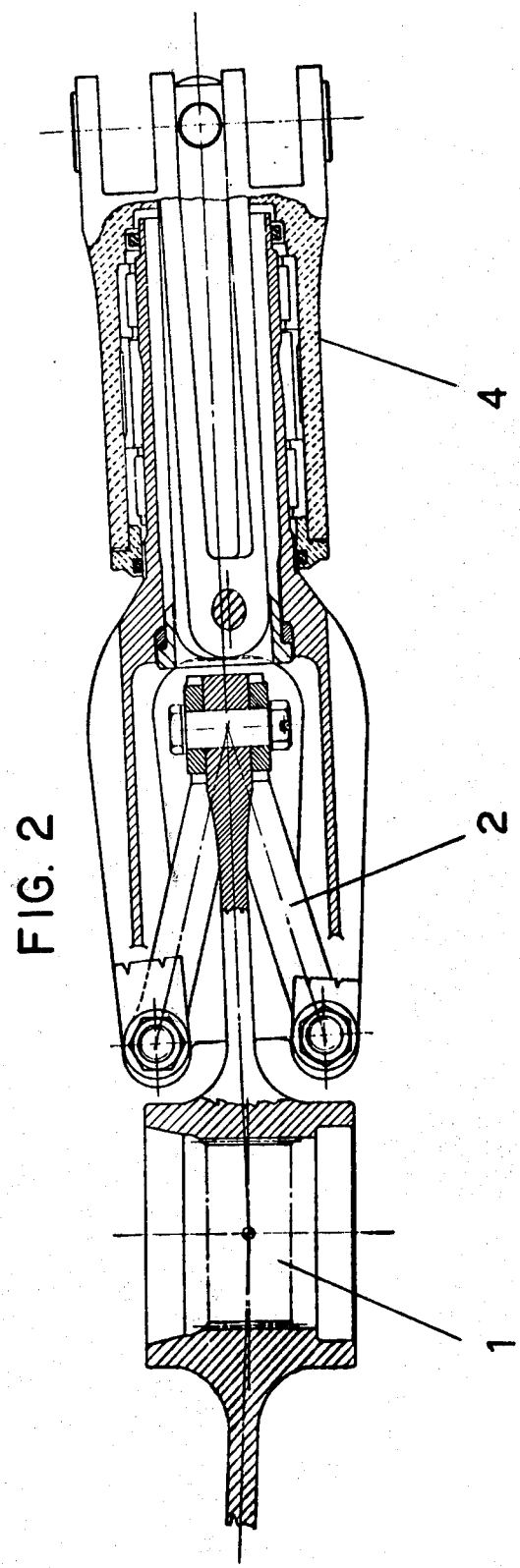
FIG. 2 is a side view in partial cross section.
Figure 3:
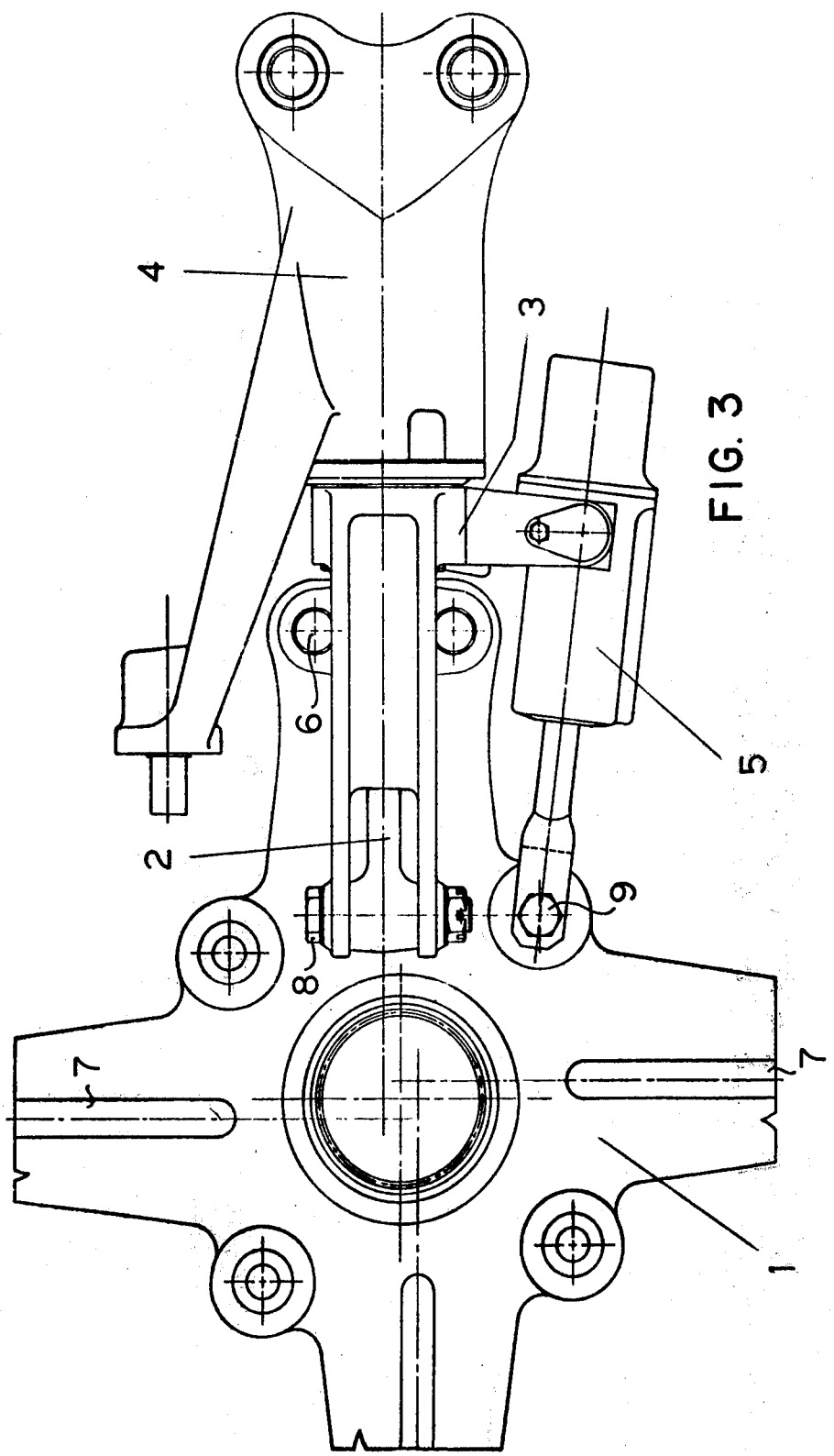
FIG. 3 is a general plan view.

It will be noted from the drawings that the helicopter rotor hub in question consists of a flexible center plate 1 and vertical flexible elements 2.

Center plate 1 is provided with 4 projecting arms, as shown, one for each blade, and is connected to the main drive shaft (not shown) preferably by means of a splined coupling or other suitable means.

The ends of the projecting arms of center plate 1 are joined by pins or calibrated bolts 6 to the outer ends of vertical flexible elements 2 which are in turn fitted into slots 7 provided for this purpose in the projecting arms of the center plate.

The opposite ends of vertical flexible elements 2, closest to the main driving shaft are in turn joined to spindles 3, also by means of pins or calibrated bolts 8.

Grips 4 for attachment of the rotor blades (not shown) are connected to spindle 3 in the conventional manner by means of roller bearings or equivalent devices so as to permit pitch variation rotation as well, as by skeins of wire ropes, laminae or equivalent means having a low torsional stiffness, so as to withstand the axial load deriving from centrifugal force.

A blade damper 5 connected to spindle 3 by attaching means 10 and center plate 1 by pins or calibrated bolts 9 provides the damping action for the lag movement.

The operation of the rotor hub according to this invention is evident from the above description. The movement of the individual rotor blades on the vertical flapping plane is made possible by the low stiffness of plate 1 in that direction while movement on the horizontal lag plane is permitted by the low stiffness of related element 2 to bending stress in that direction. The load originating from the blades practically does not give rise to any deformation on the horizontal plane, due to the very high rigidity of center plate 1 in that plane, nor on the vertical plane, because of the rigidity of vertical element 2 in that plane.

The centrifugal force resulting from rotation of the rotor, produces a mainly tensile stress on the projecting parts or arms of plate 1, while it causes a prevalently compressive stress on vertical elements 2.

As already stated, the form herein described and illustrated is only a perferred embodiment of the invention and those skilled in the art will readily realize that variations are possible without departing from the spirit and scope of the invention. Accordingly, while the hub contemplated in this invention is for a 4 blade rotor, it may obviously be applied conveniently also to rotors with three or more blades, simply by modifying the configuration of the center plate.

The center plate contemplated in this invention is set horizontally with vertical elements fitted into the slots of its projecting parts but it may also be set vertically, with horizontal elements fitted into the slots of its projecting parts.

It goes without saying that the above considerations on the operation of the various components should in such case be subject to modification accordingly.

I claim:
1. A helicopter rotor hub for mounting a plurality of rotor blades to be driven by a main drive shaft of a helicopter comprising:
a center plate having a middle portion for connection to the main drive shaft of the helicopter, said center plate having a generally flat planar configuration lying in a plane extending generally perpendicularly to said main drive shaft;
a plurality of projecting arms spaced equiangularly about said middle portion;

means defining a radially extending slot in each of said projecting arms, said slot extending radially along the middle length of said projecting arm;

a plurality of flexible elements each having a generally flat planar configuration lying in the plane extending perpendicularly to said projecting arms, each of said flexible elements being fitted into one of said slots of said projecting arms;

means defining a first end of each of said flexible elements located adjacent to said middle portion of said center plate;

means defining a second end of each of said flexible elements located remote from said middle portion of said center plate;

means defining an end of each of said projecting arms located at the terminal portion thereof furthest away from said middle portion;

means connecting each of the second ends of each of said flexible elements to one end respectively of each of said projecting arms;

a plurality of spindles each having a first end proximate said middle portion of said center plate and a second end remote therefrom, each of said spindles being connected at said first end thereof to said first end of one of said flexible elements; and a plurality of grips, each of said grips connected to said second end of one of said spindles, said grips mounting the rotor blades of said helicopter.

2. A helicopter rotor hub according to claim 1 wherein said center plate is arranged to lie in a substantially horizontal plane, with each of said flexible elements lying in a substantially vertical plane, said center plate being configured to be flexible in directions extending generally perpendicularly to said horizontal plane and rigid in directions extending generally perpendicularly to said vertical plane, with each of said flexible elements being configured to be generally flexible in directions extending generally perpendicularly to said vertical plane and substantially rigid in directions extending substantially perpendicularly to said horizontal plane, said center plate and said flexible elements being interconnected in such a manner that the rotor blades attached to said grips have imparted thereto flapping and lag movements.

3. A helicopter rotor hub according to calim 1 wherein said center plate is arranged to lie in a substantially vertical plane with each of said flexible elements being arranged to lie in a substantially horizontal plane, said center plate being configured to exhibit flexibility in directions extending generally perpendicularly to said vertical plane, with said flexible elements being configured to exhibit flexibility in directions extending generally perpendicular to said horizontal plane and rigid in directions extending generally perpendicular to said vertical plane, said center plate and said flexible elements being interconnected in a manner to impart to said rotor blades attached to said grips ability to attain lag and flapping movements.

4. A helicopter rotor hub according to claim 1 wherein said center plate and said flexible elements are configured and interconnected to operate as virtual hinges, the flexibility thereof being capable of accurate proportioning in order to provide flexible mounting for blades of a helicopter rotor of the articulated-joint type.

5. The helicopter rotor according to claim 1, further comprising a plurality of blade dampers, each of said blade dampers having one end connected to said center plate and the other end to one of said spindles, whereas the lag movement of the blades is damped.

6. The helicopter rotor hub according to claim 1, wherein each plurality of projecting arms, flexible elements, spindles, and grips is four in number.

* * * * *